United States Patent [19]

Desperben et al.

[11] Patent Number: 4,687,999

[45] Date of Patent: Aug. 18, 1987

[54] CIRCUIT FOR RECOVERING THE CARRIER WAVE IN DIGITAL TRANSMISSION SYSTEMS

[75] Inventors: Lydie Desperben, Bois-Colombes; Hikmet Sari, Creteil; Saïd Moridi, Paris, all of France

[73] Assignee: U.S. Philips Corporation, New York, N.Y.

[21] Appl. No.: 855,527

[22] Filed: Apr. 23, 1986

[30] Foreign Application Priority Data

Apr. 30, 1985 [FR] France .................................. 85 06561

[51] Int. Cl.⁴ .............................................. H03D 3/18
[52] U.S. Cl. .................................. 329/109; 329/124; 375/39; 455/214
[58] Field of Search ............... 329/104, 109, 110, 112, 329/122, 124, 146; 375/39, 120; 455/214

[56] References Cited

U.S. PATENT DOCUMENTS 3,983,499 9/1976 Tan .................................. 329/104 X
4,571,550 2/1986 Head .............................. 329/109 X

FOREIGN PATENT DOCUMENTS 2552959 4/1985 France .

OTHER PUBLICATIONS

IEEE Trans. Commun., vol. COM-31, No. 1, Jan. 1983, pp. 130-136.
IEEE Trans. Commun., vol. COM-27, No. 12, Dec. 1979, pp. 1953-1958.
Electronics & Communication in Japan, vol. 63-B, No. 7, 1980, pp. 75-84.

Primary Examiner—Eugene R. LaRoche
Assistant Examiner—Robert J. Pascal
Attorney, Agent, or Firm—Marianne R. Rich; Anne E. Barschall

[57] ABSTRACT

A circuit for recovering the carrier of a digitally modulated wave having a phase symmetry $2\pi/M$, wherein M is the order of the symmetry, includes means for automatic and fast acquisition comprising a voltage-controlled oscillator having an output supplying said carrier and a control input to which an error signal $\epsilon(\phi)$ is applied in order to change the oscillator phase and to adjust it to the phase of the digital modulated wave. This wave is introduced in two channels, one being in phase and the other being in quadrature with the carrier, each comprising the series arrangement of: a demodulator, a low-pass filter, reconstruction means for reconstructing a signal and for determining the error between the filtered and reconstructed signals, the quadrature channel comprising in addition a 90° phase shifter, the two channels being joined together with the aid of a phase comparator arrangement which produces a comparison signal and a variable-rate sampling clock. With the representation of the signals from the in-phase and quadrature channels defining the states of a signal constellation of the modulated wave, the phase comparator arrangement comprises means for selecting received signal points with the aid of zones which are centered on or eccentric to certain diagonal states of the signal constellation, and means for generating the sampling clock by eliminating from a recovered symbol clock an active edge capable of validating zero crossings of the comparator signal which do not correspond to a phase difference equal to $2k\pi/M$ (k and M integers).

5 Claims, 7 Drawing Figures

CIRCUIT FOR RECOVERING THE CARRIER WAVE IN DIGITAL TRANSMISSION SYSTEMS

BACKGROUND OF THE INVENTION

1. Field of the Invention

The invention relates to a circuit for recovering the carrier of a digitally modulated wave having a phase symmetry $2\pi/M$, where M is the symmetry order. The circuit includes means for fast automatic acquisition comprising a voltage-controlled oscillator having an output supplying said carrier and a control input to which an error signal $\epsilon(\phi)$ is applied in order to change the oscillator phase and to adjust it to the phase of said digitally modulated wave. Said wave is introduced:

in a first channel comprising the series arrangement of:
- a demodulator receiving said modulated wave and the oscillator output signal, and producing an in-phase demodulated signal $X_1$,
- a low-pass filter acting on the demodulated signal $X_1$ and producing a filtered signal $X$,
- means for reconstructing a signal $\hat{X}$ and for determining the error $e_x = X - \hat{X}$ between the signals $X$ and $\hat{X}$, in a second channel comprising the series arrangement of:
- a phase-shifter for shifting the phase of the oscillator through 90°,
- a demodulator receiving said modulated wave and the phase shifter output signal and producing a quadrature-phase demodulated signal $Y_1$,
- a low-pass filter acting on the demodulated signal $Y_1$ and producing a filtered signal $Y$,
- means for reconstructing a signal $\hat{Y}$ and for determining an error signal $e_y = Y - \hat{Y}$ between the signals $Y$ and $\hat{Y}$.

These two channels are joined together with the aid of a phase comparator arrangement which receives the signals $X$, $e_x$, $Y$, $e_y$ and a basic clock H (recovered symbol clock) and produces a comparator signal S, and also a variable-rate sampling clock which reproduces the basic clock H by excluding certain edges. The comparator signal S enters a bistable trigger under the control of said sampling clock. The bistable trigger output is connected to an amplifying filter which produces the oscillator control error signal $\epsilon(\phi)$. The representation by in-phase and quadrature-phase signal points defines states of a signal constellation of said digitally modulated wave.

The invention also relates to arrangements in which the carrier recovery circuit is used such as digital transmission arrangements, more specifically those arrangements in which digital information, after having been transmitted by modulation of an electro-magnetic wave, is recovered by coherent demodulation. These arrangements are employed in data transmission modems, microwave radio links, space or optical communication systems for heterodyne links.

2. Prior Art

For effecting coherent demodulation, the phase of the carrier is generally recovered with the aid of an oscillator included in a carrier recovery loop. The voltage of this oscillator is controlled by a filtered version of the output signal of a phase comparator which detects the phase error between the oscillator and the transmission carrier.

For digital modulation schemes having a large number of states, the phase difference between the oscillator and the carrier must be limited to small values. The noise bandwidth of the recovery loop is then reduced by means of narrow-band low-pass filtering. This reduction results in very low phase noise, but also in a considerable decrease of acquisition range. To off-set this disadvantage, auxiliary arrangements are used for assisting in the acquisition.

In the prior art, amongst these auxiliary arrangements are frequency discriminators which generate a voltage depending on the frequency difference between the oscillator and the carrier, as described in, for example, French Patent Application No. 83 15794 (Publication No.: 2 552 959). This application relates to a carrier recovery circuit for digital modulation schemes having a phase symmetry $2\pi/M$. In that circuit a variable-rate sampling of the output signal of the phase comparator changes the latter into a frequency discriminator. This property is obtained by eliminating zero-crossings of the phase comparator output which occur when the phase error between the oscillator and the carrier is equal to $(\pi/M) + (2k\pi/M)$, where k and M are integers.

For multi-state digital amplitude modulation of two quadrature carriers, the frequency discriminator described in the above-mentioned application has drawbacks. Its gain is degraded, because at the sampled output of the phase comparator zero-crossings occur which are taken into account, but do not correspond to a zero phase error. Actually, starting from a basic clock H, this frequency discriminator generates a sampling clock, in which certain active edges of the basic clock H are eliminated. This elimination occurs when zero crossings are detected for which the phase difference between the oscillator and the carrier wave is equal to $(\pi/M) + (2k\pi/M)$.

But experience has taught that, in phase and amplitude modulation, there are other zero-crossings at the output of the phase comparator which corrupt a correct acquisition of the carrier. In, for example, the case of 16 QAM modulation, the output of the currently used phase comparators have zero-crossings when the phase difference is equal to $\theta = \arctan(\frac{1}{3})$ for the states (3, 1), (−1, 3), (−3, −1), (1, −3). Other states present a similar behaviour. In addition, in the case of a more important number of modulation states, the number of these unwanted zero-crossings will increase, and this causes a deterioration of the performances of the discriminator.

SUMMARY OF THE INVENTION

The invention has therefore for its object to obviate this degradation by avoiding taking all these unwanted zero-crossings into account.

In accordance with the invention, the carrier recovery circuit of the type set forth in the opening paragraph is characterized in that the phase comparator arrangement comprises means for selecting received signal points with the aid of selection zones. The zones are located around certain diagonal states of said signal constellation and arranged so that circles passing through non-diagonal states do no intersect said selection zones. The zones are also arranged so that the zones traced around the states of the type ($\pm 1$, $\pm 1$) do not come into contact with the axes (OX, OY) of said signal constellation. The phase comparator arrangement also comprises means for generating said sampling clock by eliminating from said basic clock H all active edges capable of validating in said bistable trigger zero-crossings of the comparator signal S which do not correspond to a phase difference equal to 2kπ/M, where k and M are integers.

This circuit is based on storing the sign of the phase comparator output signal when the absolute value of this phase difference exceeds a predetermined value. This storage is effected in a bistable trigger whose output supplies a voltage which remains constant between two valid, recognized zero-crossings. This constant voltage has the same sign as the frequency difference between the oscillator and the carrier.

To effect storage, zones are defined for which the phase errors at the output of the comparator become zero once only. The sign of the phase comparator output remains identical to the sign of the phase error.

This carrier recovery circuit utilizes a phase comparator having the following properties:

its characteristic becomes zero at the occurrence of a zero phase error;

its characteristic has a periodicity of 2π/M, where M is the symmetry order of the modulation.

The invention is used for digital modulation schemes having a phase symmetry 2π/M, where M is the symmetry order of the signal constellation. Thus, a 4-state phase modulation (4 PSK) has a symmetry of the order of 4. For a 8-state phase modulation (8 PSK) the symmetry is of the order of 8. For a 16 QAM modulation (phase and amplitude modulation by means of amplitude modulation of two quadrature carriers) the symmetry is of the order of 4.

The invention has definite advantages for amplitude and phase modulation schemes in which the phase differences between certain points of the signal constellation are less than the symmetry 2π/M. Thus, in 16 QAM modulation, the symmetry is of the order of π/2, but the phase difference between the states (1, 1) and (1, 3) is π/4-arc tan (⅓), so less than π/2.

During the carrier acquisition period the digitally modulated wave will be able to present all the signal points of the signal constellation. Consequently, the invention cancels all the received signal points liable to cause a faulty acquisition.

Thus, the carrier recovery circuit according to the invention includes means for selecting the received signal points with the aid of zones located around certain states of the signal constellation.

This selection is effected by determining whether the received signal points belong or do not belong to zones having the following properties:

every received signal point in these zones presents a phase difference with respect to the transmitted signal point in a manner such that the absolute value of this phase difference remains below, except at 2kπ/M, a predetermined value, which renders it possible to eliminate the zero-crossing transitions at kπ/M;

every signal reconstructed from a received signal point in these zones is identical, except at 2kπ/M, to the corresponding, transmitted signal.

Thus, the information taken into account is only the information supplied by the received signal points in these zones. In QAM modulation schemes, these zones may be formed by squares centred on the diagonal states of the signal constellation. Put more generally, the zones may consist of a closed contour, bounded in X and Y, encircling these diagonal states.

To determine whether these points belong to these zones, and thereafter taking account of the information assignable thereto, the invention provides a phase comparator arrangement for use in a carrier recovery circuit. For that purpose, the digitally modulated wave is simultaneously fed into two demodulators, which also receive the output of the oscillator, one directly and the other through a π/2 phase shifter, and produce the demodulated signals $X_1$ and $Y_1$, respectively. These demodulated signals are filtered and supply the respective signals X (in-phase) and Y (quadrature) from which the reconstructed signals $\hat{X}$ and $\hat{Y}$ are obtained. The errors $e_x$ and $e_y$ between the filtered and reconstructed signals, and also the signals X and Y, themselves, are fed into the phase comparator arrangement which produces a binary signal indicating the sign of the characteristic of the phase comparator for the angle $\phi$ appearing between the received modulated wave and the oscillator wave. This binary signal is fed into a bistable trigger under the control of the sampling clock which only comprises the desired active edges. The output of the bistable trigger is filtered and thereafter amplified for producing the control signal $\epsilon(\phi)$ for the oscillator. The comparator arrangement generates a signal $P_z$ which characterizes the selection of the zones used for constructing the sampling clock.

BRIEF DESCRIPTION OF THE DRAWINGS

The invention and how it can be put into effect will be better understood from the following description given by way of non-limitative example with reference to the accompanying drawings, in which.

DETAILED DESCRIPTION OF THE DRAWINGS

Figure 1:
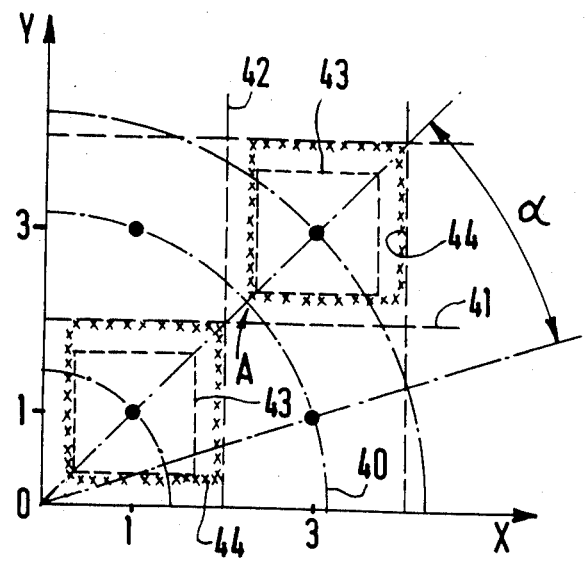
FIG. 1 shows, in a quarter plane, the 16 QAM signal constellation.

FIG. 1 shows, in a quarter plane XOY, a part of the 16 QAM constellation. It has four states (1, 1), (3, 1), (1, 3), (3, 3) in this quarter plane. For the overall plane this system has a phase symmetry $2\pi/M = \pi/2$. It has a minimal phase difference α between its states such that:

$$\alpha = \pi/4 - \text{arc tan}(\tfrac{1}{3}) < \pi/2$$

The straight lines 41, 42 and the axes OX and OY define the decision zones for the states of the quarter plane shown in FIG. 1.

In accordance with the phase variation of the incoming modulated wave relative to the oscillator, for a specific state of the signal constellation, the received signal point will shift through a circle centered at 0 and passing through the specific state. On the circle 40 passing through the states (1,3) and (3,1), there is a position A which corresponds to the smallest distance between the circle 40 and the state (3,3). A detected state located at A is interpreted as being a state (3,3) whereas actually a state (3,1) or a state (1,3) subject to a phase deviation is involved. Therefore the invention defines, around each diagonal state, and acquisition zone 43 which does not come into contact with the circle 40, for the example chosen here. For the case of 16 QAM modulation, the states selected in view of the acquisition are the states (1,1) and (3,3), as actually the phase difference between the 4 states of the type ($\pm 1, \pm 1$) and likewise between the 4 states of the type ($\pm 3, \pm 3$) amounts to $\pi/2$. In contradistinction thereto, the minimal phase difference between the 8 states of the types ($\pm 1, \pm 3$) and ($\pm 3, \pm 1$) is 2(arc tan ($\frac{1}{3}$))=36.87°. A phase error $\beta$ between the transmission and the reception exceeding, for example, approximately 19° brings a point ($+1, +3$) into the decision zone of the point ($-1, +3$). Consequently, with the points ($\pm 1, \pm 3$) and ($\pm 3, \pm 1$), a phase error $\beta$ cannot be distinguished from an error 2(arc tan ($\frac{1}{3}$))$-\beta$ or a phase error $2\alpha-\beta$ (for $\alpha$, see FIG. 1). During the transmission of a state ($+3, +1$) and for a phase error of, for example, $+48°$, the received signal point may be detected as a state ($+1, +3$) with an estimated phase error of $-5°$. Similarly for a state ($3,-1$) with a phase error of, for example, $+48°$ the received signal point may be detected as a state ($+3,+1$) with an estimated phase error of $+11°$. Thus, when the phase error modulo $\pi/2$ is taken into account only when it is less than, for example, 15°, it is evident that the non-diagonal states cannot be taken into account, as it would be impossible to determine whether the detected phase error is within the predetermined interval. The invention thus selects the states which have the same symmetry as the modulation itself and defines around each state a zone, 43 or 44, in which the acquisition can be effected. The acquisition zone 43 is centred around the selected state. In contradistinction thereto, the acquisition zone 44 is eccentric.

Figure 2:
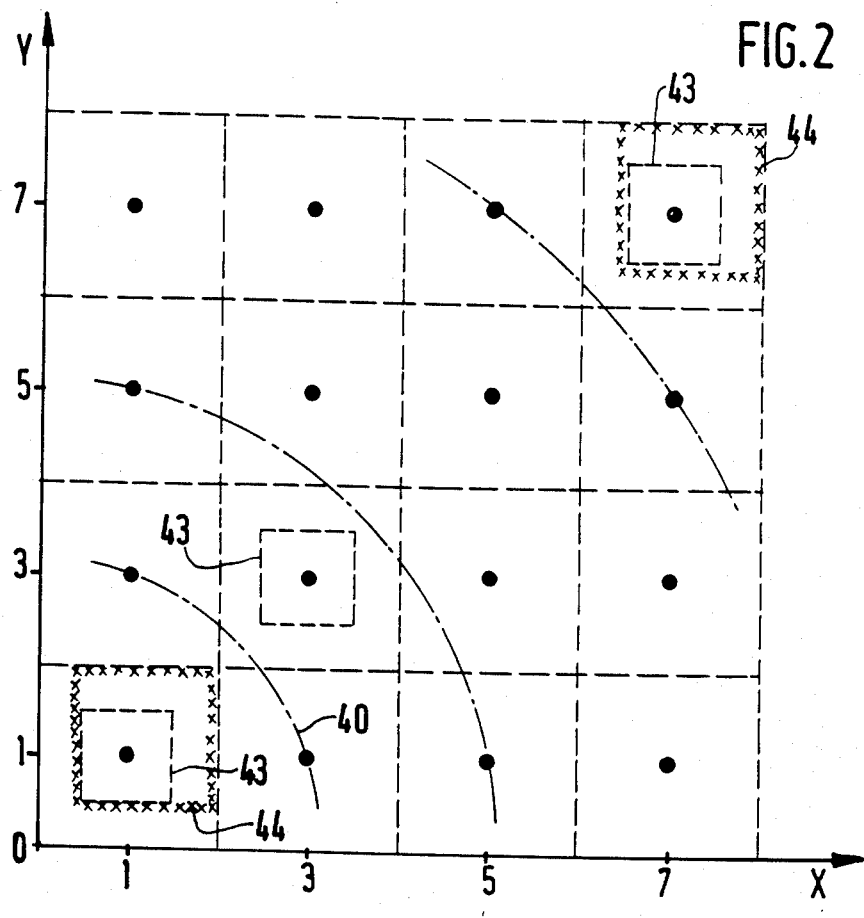
FIG. 2 shows, in a quarter plane, the 64 QAM signal constellation.

FIG. 2 shows the same type of representation for a 64 QAM modulation. In this case the acquisition problems are much more numerous because of the presence of a large number of states that can lead to a disturbance of the acquisition mechanism. In this case the selected states are the states (1,1),(3,3), (7,7), which have a symmetry order identical to the symmetry order of the modulation itself. The state (5,5) cannot be selected as it is located on the circle which passes through the states (1,7) and (7,1). Around each of the selected states an acquisition zone 43 or 44 is defined in which the acquisition must be effected, this acquisition zone not contacting the circles passing through the other states.

Figure 3:
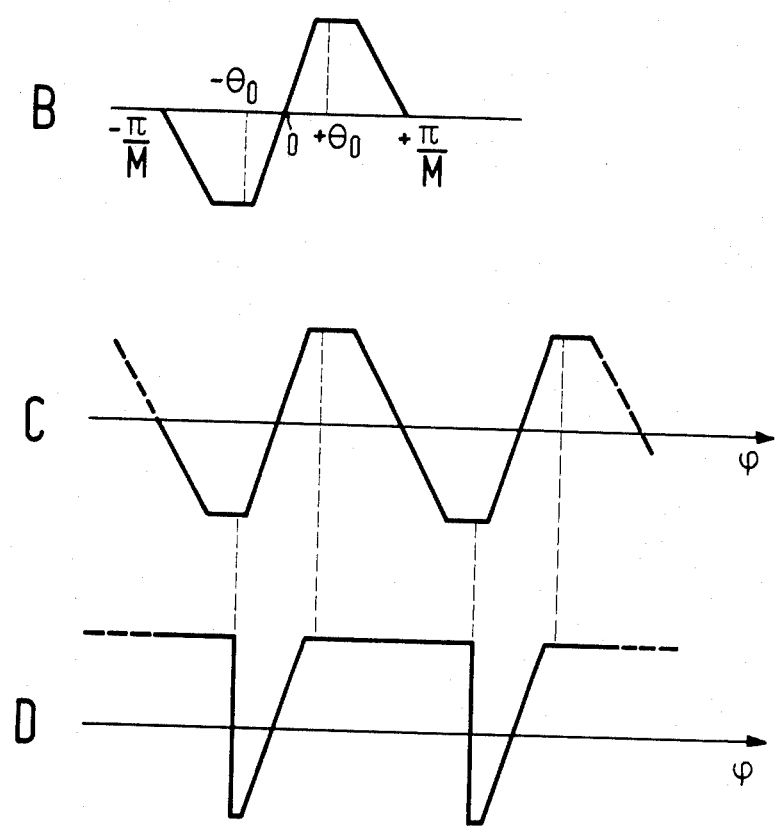
FIG. 3 shows the characteristic of the phase comparator and the variation of the phase comparator output signal as a function of the phase, before and after storage in a bistable trigger.

FIG. 3 shows at B the characteristics of a phase comparator for a phase comprised between $-\pi/M$ and $+\pi/M$. On both sides of the point o (zero phase difference), the phase comparator produces a voltage as a function of the phase deviation which renders it possible to control the oscillator frequency. The comparator output voltage is shown at C. The mean value of this output voltage is zero. In order to effect the correction of the oscillator frequency, the phase comparator output voltage is stored by means of the selection and acquisition means embodying the invention. When the absolute value of the phase deviation exceeds a value $\theta_o$, which corresponds to crossing the selected acquisition zone, an acquisition circuit stores the state of the comparator output signal. Such a stored signal is shown at D, its mean value is no longer equal to zero. It renders it possible to effect the correction of the oscillator frequency. The curves C and D of FIG. 3 are representative of a positive frequency deviation, that is to say a carrier frequency of the modulated wave which is higher than the oscillator frequency. The curves C and D have the opposite shapes for a negative frequency deviation.

Figure 4:
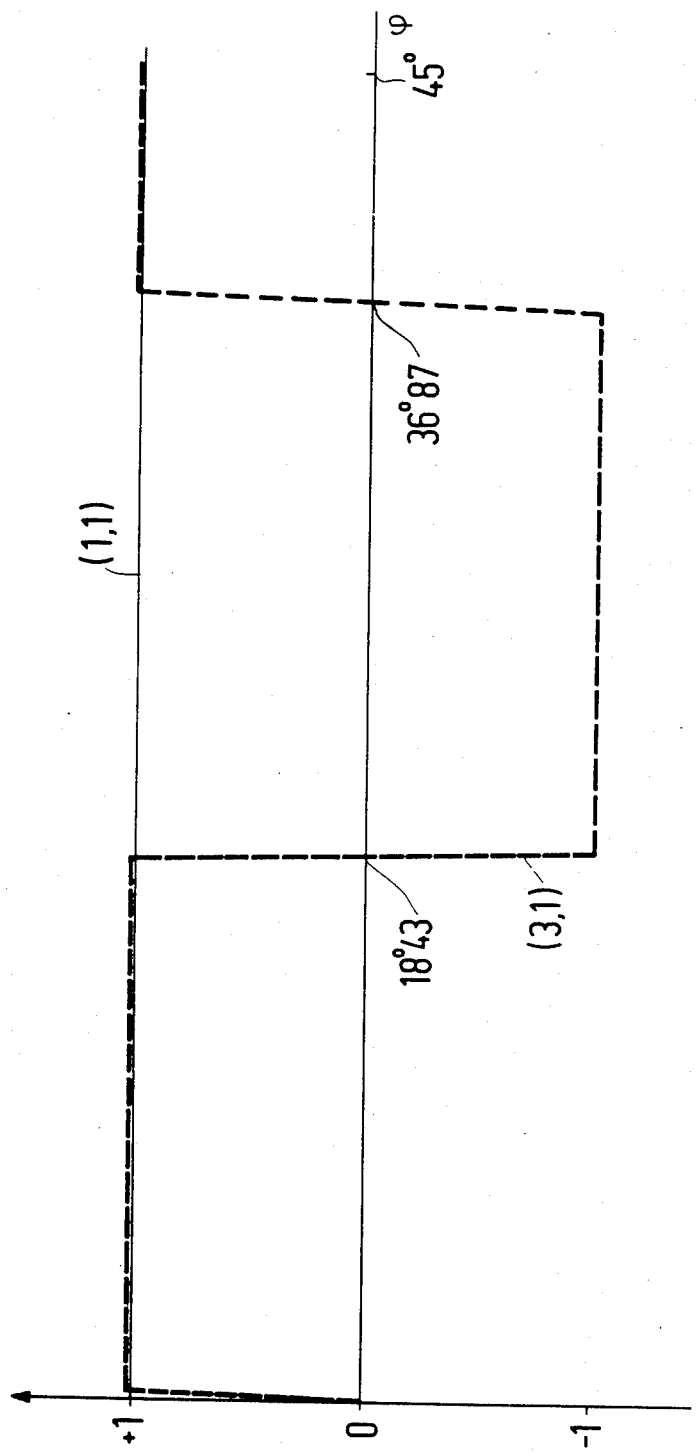
FIG. 4 shows the variation of the phase comparator output signal as a function of the phase for certain states of the 16 QAM signal constellation.

FIG. 4 shows, in the case of 16 QAM modulation, the state of the phase comparator output for a phase difference varying from 0 to $\pi/4$. This range is sufficient, as the characteristic of the comparator has a period of $\pi/2$ and has odd symmetry (with respect to o). The relevant comparator is a comparator of conventional type, which produces an output signal S such that $S=-\text{sgn}(e_y)\cdot\text{sgn}(X)$ if $\text{sgn}(e_y)\cdot\text{sgn}(X)$ has a sign opposite to $\text{sgn}(e_x)\cdot\text{sgn}(Y)$, and such that S retains the value present at the preceding instant in the opposite case. Such a comparator will produce a signal which, considered over a half-period (0, $\pi/4$) will show certain singularities according to the state of the signal constellation under consideration. Thus, by limiting the analysis to the half-period (0, $\pi/4$) or half the symmetry, it is found that certain states will lead to zero-crossings of the comparator output for which the phase error is however unequal to zero. Thus, FIG. 4 shows that a state (3,1) may result in zero-crossings of the comparator output which must be eliminated for effecting the acquisition.

Figure 5:
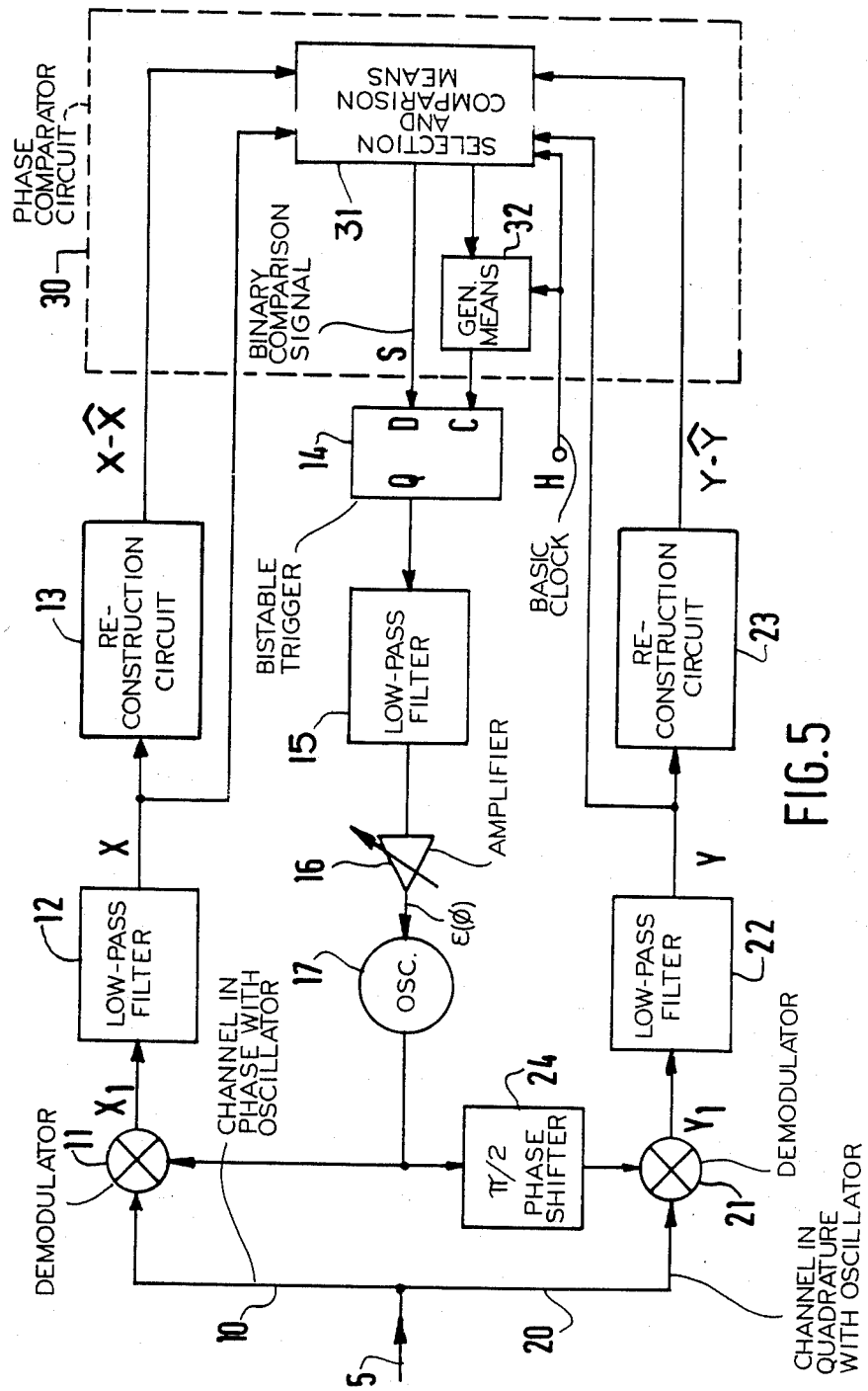
FIG. 5 shows a block diagram of the carrier recovery circuit according to the invention.

FIG. 5 shows the block diagram of the carrier recovery circuit. The digitally modulated wave arrives at the input terminal 5 and feeds two channels 10 and 20 which are in-phase and in-quadrature, respectively, with the wave from the oscillator 17. This oscillator applies its signal directly to the demodulator 11 of the in-phase channel and to the demodulator 21 in the quadrature channel via the $\pi/2$ phase shifter 24. The outputs of the demodulators 11 and 21 are filtered in the respective low-pass filters 12 and 22, whose output signals are the respective signals X and Y. These signals are applied to the reconstruction circuits 13 and 23, respectively, which produce the respective errors $e_x=X-\hat{X}$ and $e_y=Y-\hat{Y}$ between the filtered signals X and Y and the reconstructed signals X and Y.

The error signals $e_x$ and $e_y$ and also the filtered signals X and Y are fed into the phase comparator circuit 30, which also receives the basic clock H and produces the binary comparison signal S and the sampling clock. These two signals are applied to a bistable trigger 14 whose data input receives the comparator signal S and whose clock input receives the sampling clock coming from the selection and comparison means 31 and the generating means 32 which constitute the phase comparator arrangement 30, embodying the invention. The output signal of the bistable trigger 14 is applied to a low-pass filter 15 and thereafter to an amplifier 16 for producing the control signal $\epsilon(\phi)$ which controls the oscillator 17.

Figure 6:
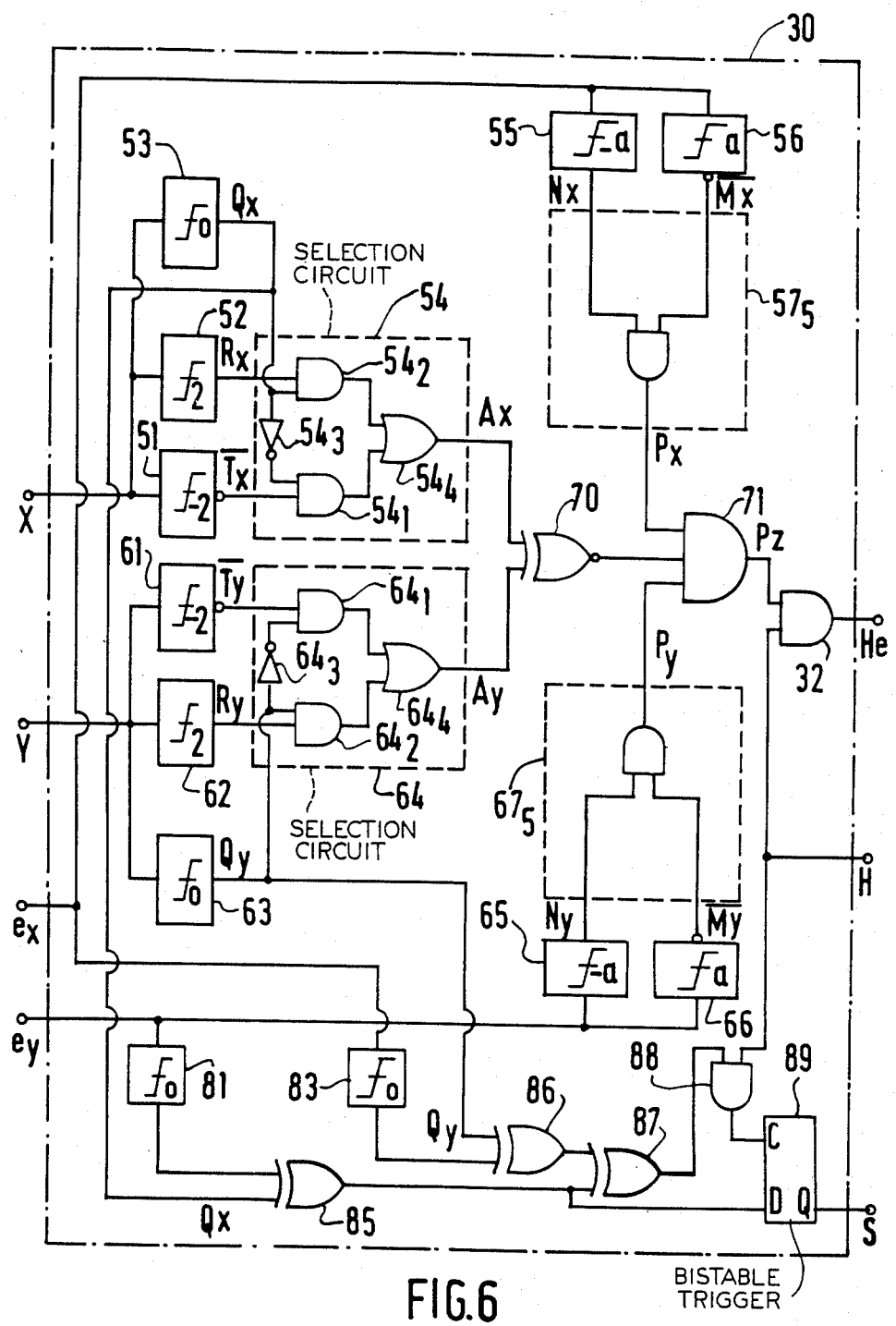
FIG. 6 shows a logic circuit diagram of the phase comparator arrangement according to the invention for the case where square zones are centred on the states of the signal constellation.

FIG. 6 shows the logic circuit diagram of an embodiment of the phase comparator arrangement 30 according to the invention, for the case in which the square zones are centred on the diagonal states of a 16 QAM constellation. At its inputs it receives the signals X, Y, $e_x=X-\hat{X}$, $e_y=Y-\hat{Y}$ and the basic clock H. It produces the signal S and the sampling clock He. The signal Y is applied to:

a comparator 61 having a threshold $-2$ which produces the signal $\overline{T}_y$, a comparator 62 having a threshold 2 which produces the signal $R_y$, a comparator 63 having a threshold 0 which produces the signal $Q_y$.

The signals $\overline{T_y}$, $R_y$, $Q_y$ enter a selection circuit 64 which effects the logic operation defined by $$A_y = R_y \cdot Q_y + \overline{T_y} \cdot \overline{Q_y},$$

where the symbol (·) represents the logic AND function an the symbol (+) represents the logic OR function. This operation is realized with the aid of an AND-gate $64_2$ receiving $R_y$ and $Q_y$, and inverter $64_3$ producing $\overline{Q_y}$, which signal is inverse to the input signal $Q_y$, and AND-gate $64_1$ receiving the signals $\overline{T_y}$ and $\overline{Q_y}$, the outputs of the AND-gates $64_1$ and $64_2$ entering an OR-gate $64_4$ which produces the signal $A_y$.

The signal X is processed in the same way as the signal Y. It enters into a comparator 51 having a threshold −2 which produces the signal $\overline{T_x}$ a comparator 52 having a threshold 2 which produces the signal $R_x$ a comparator 53 having a threshold 0 which produces the signal $Q_x$.

The signals $\overline{T_x}$, $R_x$ and $Q_x$ enter a selection circuit 54 which effects the logic operation defined by:

$$A_x = R_x \cdot Q_x + \overline{T_x} \cdot \overline{Q_x}.$$

This operation is effected with the aid of an AND-gate $54_2$ receiving $R_x$ and $Q_x$, and inverter $54_3$ producing $\overline{Q_x}$, which signal is inverse to the input signal $Q_x$, an AND-gate $54_1$ receiving the signals $\overline{T_x}$ and $\overline{Q_x}$, the outputs of the AND-gates $54_1$ and $54_2$ entering an OR-gate $54_4$ which produces the signal $A_x$.

On the other hand the signal $e_y$ enters into:

a comparator 65 having a threshold =a producing the signal $N_y$ a comparator 66 having a threshold a producing the signal $\overline{M_y}$.

The signals $N_y$ and $\overline{M_y}$ enter an AND-gate $67_5$ which effects the logic operation defined by $P_y = N_y \cdot \overline{M_y}$.

Similarly, the signal $e_x$ enters into:

a comparator 55 having a threshold −a producing the signal $N_x$ a comparator 56 having a threshold a producing the signal $\overline{M_x}$.

The signals $N_x$ and $\overline{M_x}$ enter an AND-gate $57_5$ which effects the logic operation defined by $P_x = N_x \cdot \overline{M_x}$.

The signals $A_x$ and $A_y$ enter an exclusive NOR-gate 70 whose output enters, together with the signal $P_x$ and $P_y$, an AND-gate 71 which produces the signal $P_z$. This signal $P_z$ indicates whether the received point (X, Y) belongs or does not belong to the specific zones one wants to detect.

The signal $P_z$ and the basic clock H enter an AND-gate 32 which produces the sampling clock He.

On the other hand, the sign of the signals $e_x$, $e_y$, X, Y is determined with the object of determining, at a given instant, the output signal S such that $$S = \text{sgn}(e_y) \cdot \text{sgn}(X)$$

when $e_x \cdot Y$ has a sign opposite to $e_y \cdot X$ and such that S preserves the value of the preceding instant in the opposite case.

For that purpose the signal $e_y$ is applied to a comparator 81 the signal $e_x$ is applied to a comparator 83.

The outputs of the comparators 81 and 53 enter an exclusive OR-gate 85 and the outputs of the comparators 83 and 63 enter an exclusive OR-gate 86. The outputs of the gates 85 and 86 enter an exclusive OR-gate 87 whose output enters, together with the basic clock H, an AND-gate 88 which produces a signal serving as a clock for a bistable trigger 89, whose input data originate from the output of the exclusive OR-gate 85. This bistable trigger 89 produces an output signal S which enters the data input of the bistable trigger 14 of FIG. 5, the clock of the latter being constituted by the sampling clock.

Figure 7:
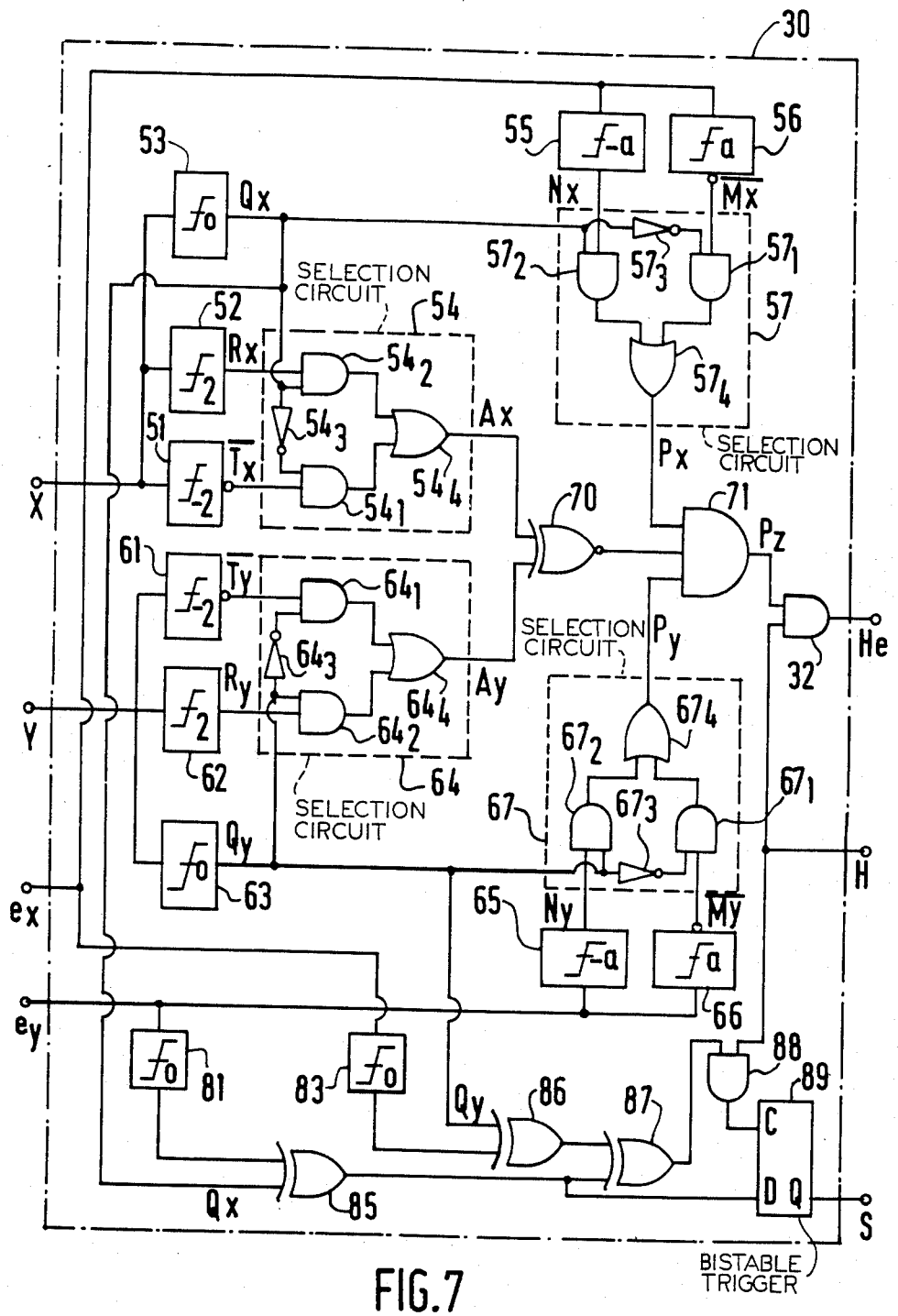
FIG. 7 shows a logic circuit diagram of the phase comparator arrangement according to the invention for the case where square zones are not centred on the states of the signal constellation.

FIG. 7 shows the logic circuit of an embodiment of the phase comparator arrangement 30 according to the invention for the case of zones which are eccentric to the diagonal states of a 16 QAM constellation.

A first difference is the fact that the signals $N_y$, $\overline{M_y}$ and $Q_y$ enter a selection circuit 67 which effects the logic operation defined by:

$$P_y = N_y \cdot Q_y + \overline{M_y} \cdot \overline{Q_y}.$$

This is effected with the aid of an AND-gate $67_2$ receiving $N_y$ and $Q_y$, and inverter $67_3$ producing $\overline{Q_y}$, which signal is inverse to the input signal $Q_y$, and AND-gate $67_1$ receiving the signals $\overline{M_y}$ and $\overline{Q_y}$, the outputs of the AND-gates $67_1$ and $67_2$ entering an OR-gate $67_4$ which produces the signal $P_y$.

A second difference is the fact that the signals $N_x$, $\overline{M_x}$ and $Q_x$ enter a selection circuit 57 which effects the logic operation defined by:

$$P_x = N_x \cdot Q_x + \overline{M_x} \cdot \overline{Q_x}.$$

This is done with the aid of an AND-gate $57_2$ receiving $N_x$ and $Q_x$, an inverter $57_3$ producing $\overline{Q_x}$, which signal is inverse to the input signal $Q_x$, an AND-gate $57_1$ receiving the signals $\overline{M_x}$ and $\overline{Q_x}$, the outputs of the AND-gates $57_1$ and $57_2$ entering an OR-gate $57_4$ which produces the signal $P_x$.

All the signals are thereafter processed in a manner similar to the manner utilized in FIG. 6.

Obviously, the logic circuits shown in FIGS. 6 and 7 are non-limitative examples and any other logic circuit corresponding to the object of the invention is also appropriate.

What is claimed is:

1. A circuit for recovering the carrier of a digitally modulated wave, said digitally modulated wave having a phase symmetry $2\pi/M$, where M is the symmetry order, comprising:
  (a) means for fast automatic acquisition, including:
    (i) a voltage-controlled oscillator, having an output at which said carrier is provided, and having a control input for receiving an error signal $\epsilon(\phi)$, said oscillator changing phase in response to said error signal $\epsilon(\phi)$
    (ii) a first channel, coupled to receive said digitally modulated wave, said first channel including the following elements in series:
      (A) a demodulator producing an in-phase demodulated signal $X_1$, said demodulator being coupled to receive said digitally modulated wave and said output carrier of said oscillator;

(B) a low-pass filter, coupled to receive said demodulated signal $X_1$, and producing therefrom a filtered signal X; and (C) means for determining an error $e_x$, said means for determining including:

(I) means for producing a reconstructed signal $\hat{X}$ from said filtered signal X; and (II) means for combining said reconstructed signal $\hat{X}$ and said filtered signal X to derive said error $e_x = X - \hat{X}$;

(iii) a second channel, coupled to receive said digitally modulated wave, said second channel including the following elements in series:

(A) a phase shifter for shifting the output carrier of said oscillator by 90°;

(B) a demodulator receiving said digitally modulated wave and receiving an output signal from said phase shifter and producing therefrom a quadrature phase demodulated signal $Y_1$;

(C) a low-pass filter coupled to receive said demodulated signal $Y_1$, and producing therefrom a filtered signal Y; and (D) means for determining an error $e_y$, said means for determining including:

(I) means for producing a reconstructed signal $\hat{Y}$ from said filtered signal Y; and (II) means for combining said reconstructed signal $\hat{Y}$ and said filtered signal Y to derive said error $e_y = Y - \hat{Y}$;

(iv) a phase comparator coupled to receive said error $e_x$, said error $e_y$, said filtered signal X, said filtered signal Y, and a basic clock H which corresponds to a recovered symbol clock, said phase comparator producing a comparator signal S and a variable rate sampling clock which reproduces the basic clock H by eliminating certain edges, signal points being defined in said phase comparator on an imaginary plane which has an origin and orthogonal real and imaginary axes, said signal points being defined by pairs of in-phase and quadrature-phase values, idealized ones of said signal points being states of a signal constellation, which signal constellation represents said digitally modulated wave;

(v) a bistable trigger controlled by said sampling clock and coupled to receive said comparator signal S; and (vi) an amplifying filter for producing the error signal $\epsilon(\phi)$ from an output of said bistable trigger;

(b) wherein the improvement comprises that said phase comparator includes:

(i) means for identifying some of said signal points using selection zones within said imaginary plane, said selection zones representing permissible in-phase and quadrature-phase limits for signal points which correspond to certain ones of a plurality of diagonal states, said diagonal states being those states of said signal constellation which have in-phase and quadrature phase values of equal absolute value, said selection zones being defined so that:

(A) none of at least one imaginary circle in said imaginary plane intersects said selection zones, each said imaginary circle being defined so that its center is at the origin of said imaginary plane and its circumference contains at least one said state of said signal constellation which is not a diagonal state; and (B) said selection zones do not contain the axes of said imaginary plane;

(ii) means for generating said sampling clock by eliminating from said basic clock H all active edges capable of validating in said bistable trigger zero crossings of said comparator signal S which do not correspond to a phase difference equal to $2k\pi/M$, where k is an integer.

2. The circuit of claim 1 wherein said means for identifying compares the in-phase and quadrature-phase values of said signal points with respective predetermined thresholds.

3. The circuit of claim 2 wherein the predetermined thresholds are determined such that a difference between the phases of signal points within each selection zone and the phase of the diagonal state within the selection zone has an absolute value less than a predetermined value, except at $2k\pi/M$.

4. The circuit of claim 1, 2, or 3 wherein the means for identifying and the means for generating comprise:

(a) in the first channel:

(i) two amplitude comparators comparing the error $e_x = X - \hat{X}$ to respective thresholds a and $-a$ and producing respective signals $\overline{M_x}$ and $N_x$ at a first logic value when the error $e_x$ exceeds a or is less than $-a$, respectively;

(ii) three amplitude comparators comparing the signal X to respective thresholds 0, 2 and $-2$ and producing respective signals $Q_x$, $R_x$ and $\overline{T_x}$ at the first logic value when the signal X exceeds the thresholds for the first or second comparators or is less than the threshold for the third comparator, respectively;

(iii) a first selection circuit producing a signal $P_x$ such that $P_x = N_x \cdot \overline{M_x}$; and (iv) a second selection circuit producing a signal $A_x$ such that $A_x = R_x \cdot Q_x + \overline{T_x} \cdot \overline{Q_x}$;

where the symbol (·) represents the logic AND function and the symbol (+) represents the logic OR function;

(b) in the second channel:

(i) two amplitude comparators comparing the error $e_y = Y = \hat{Y}$ to respective thresholds a and $-a$ and producing respective signals $\overline{M_y}$ and $N_y$ at the first logic value when the error $e_y$ exceeds a or is less than $-a$, respectively;

(ii) three amplitude comparators comparing the signal Y to respective thresholds 0, 2 and $-2$, and producing respective signals $Q_y$, $R_y$ and $\overline{T_y}$ at the first logic value when the signal Y exceeds thresholds for the first or second comparators or is less than the threshold for the third comparator, respectively;

(iii) a third selection circuit producing a signal $P_y$ such that $P_y = N_y \cdot \overline{M_y}$; and (iv) a fourth selection circuit producing a signal $A_y$ such that $A_y = R_y \cdot Q_y + \overline{T_y} \cdot \overline{Q_y}$;

(c) an exclusive NOR circuit receiving the signals $A_x$ and $A_y$ at its inputs;

(d) a first AND-circuit receiving the output of the exclusive-NOR circuit and the signals $P_x$ and $P_y$, for producing a signal $P_z$; and (e) a second AND-circuit receiving the signal $P_z$ and the basic clock H for producing the sampling clock.

5. The circuit of claim 1, 2, or 3 wherein the means for identifying and the means for generating comprise:
  (a) in the first channel:
    (i) two amplitude comparators comparing the error $e_x = X - \hat{X}$ to respective thresholds a and $-a$ and producing respective signals $\overline{M_x}$ and $N_x$ at a first logic value when the error $e_x$ exceeds a or is less than $-a$, respectively;
    (ii) three amplitude comparators comparing the signal X to respective thresholds 0, 2 and $-2$ and producing respective signals $Q_x$, $R_x$ and $\overline{T_x}$ at the first logic value when the signal X exceeds the thresholds for the first or second comparators or is less than the threshold for the third comparator, respectively;
    (iii) a first selection circuit producing a signal $P_x$ such that $P_x = N_x \cdot Q_x + \overline{M_x} \cdot \overline{Q_x}$; and
    (iv) second selection circuit producing a signal $A_x$ such that $A_x = R_x \cdot Q_x + \overline{T_x} \cdot \overline{Q_x}$;
    where the symbol (·) represents the logic AND function and the symbol (+) represents the logic OR function;
  (b) in the second channel:
    (i) two amplitude comparators comparing the error $e_y = Y - \hat{Y}$ to respective thresholds a and $-a$ and producing respective signals $\overline{M_y}$ and $N_y$ at the first logic value when the error $e_y$ exceeds a or is less than $-a$, respectively;
    (ii) three amplitude comparators comparing the signal Y to respective thresholds 0, 2 and $-2$ and producing respective signals $Q_y$, $R_y$ and $\overline{T_y}$ at the first logic value when the signal Y exceeds the thresholds for the first or second comparators or is less than the threshold for the third comparator, respectively;
    (iii) a third selection circuit producing a signal $P_y$ such that $P_y = N_y \cdot Q_y + \overline{M_y} \cdot \overline{Q_y}$; and
    (iv) a fourth selection circuit producing a signal $A_y$ such that $A_y = R_y \cdot Q_y + \overline{T_y} \cdot \overline{Q_y}$;
  (c) an exclusive NOR-circuit receiving the signals $A_x$ and $A_y$ at its input;
  (d) a first AND-circuit receiving the output of the exclusive NOR-circuit and the signals $P_x$ and $P_y$, and producing a signal $P_z$; and
  (e) a second AND-circuit receiving the signal $P_z$ and the basic clock H for producing the sampling clock.

* * * * *